United States Patent Office 3,499,150
Patented Mar. 3, 1970

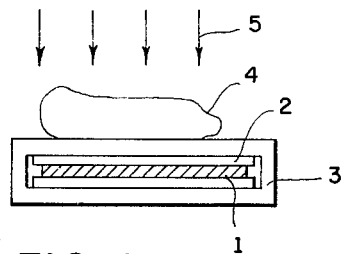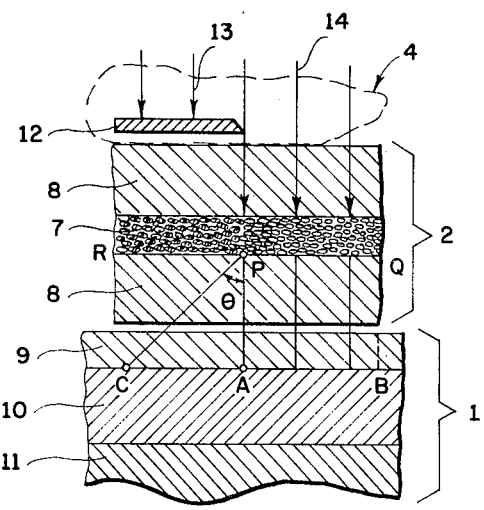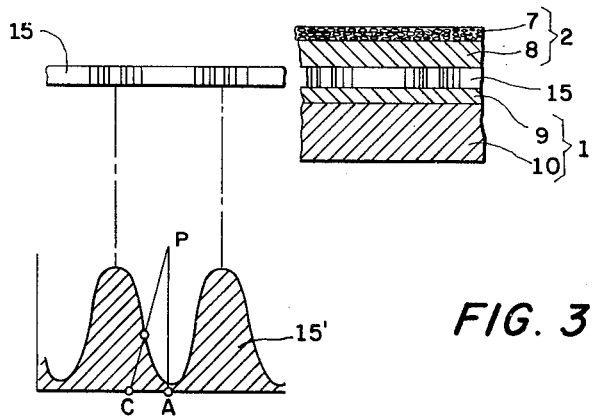

3,499,150
APPARATUS FOR RECORDING A
RADIOGRAPHIC IMAGE
Mataichi Tajima and Shigenobu Watanabe, both of 210
Nakanuma, Minami Ashigara-machi, Ashigara-Kami-gun, Kanagawa, Japan, and Yoshihiro Sunaga, 6–13
7-chome, Minami Azabu, Minato-ku, Tokyo, Japan
Filed Feb. 28, 1967, Ser. No. 624,644
Claims priority, application Japan, Feb. 28, 1966,
41/12,152
Int. Cl. H01j 1/62; G02f 1/00
U.S. Cl. 250—80    2 Claims

ABSTRACT OF THE DISCLOSURE

A method of recording radiographic images passing through an object by placing a fluorescent image and a mesh screen between an object and a light-sensitive photographic film and irradiating said assembly with X-ray or gamma-ray to record the radiographic image formed on the fluorescent layer as a dot image of the photographic film.

A light-sensitive photographic film for recording radiographic image having a mesh screen on the emulsion layer thereof.

Summary of the invention

The present invention relates to an image recording method wherein a radiograph obtained by penetrating radiation is recorded on a photographic film through fluorescing and to a material required therefor.

It is the object of this invention to obtain a record having a higher sharpness on a photographic material than in the known radiographic method.

Description of the drawings

The present invention will now be illustrated in the accompanying drawings in comparison with the prior art, in which:

FIG. 1 is a schematic view of a known image recording method;

FIG. 2 shows sectionally its fluorescing state;

FIG. 3 is a schematic view illustrating the principle of the present invention;

Figure 4:
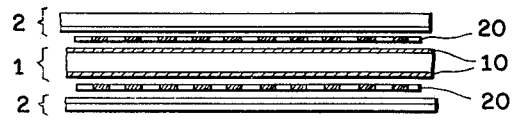
FIG. 4 is a schematic sectional view of one of the embodiments of the present invention.

Background of the invention and description of the preferred embodiments

Referring to FIG. 1, illustrating schematically one embodiment of the prior art for comparison, an object 4 is placed on photographic film 1 having light-sensitive layers on both sides, held between fluorescent intensifying foils 2, and fixed by means of adapter frame 3, and the assembly is exposed to radiation 5 to obtain an image recorded on photographic film 1. FIG. 2 shows an enlarged schematic representation of the fluorescing state of fluorescent particles of the fluorescent intensifying foil under exposure to radiation in such image recording method. The fluorescent intensifying foil 2 comprising support layer 6, fluorescent layer 7 and protective layer 8 is contacted closely with the photographic film 1 comprising protective coating 9, light-sensitive emulsion layer 10 and support film 11. Some of the radiation 13 is interrupted by a non-penetrating portion 12 of object 4, while the other 14 passing through the object and reaching fluorescent layer 7. Correspondingly, PQ of fluorescent layer 7 emits luminescence and PR does not, P being taken as a border point. At this time, AB of light-sensitive emulsion layer 10 is sensed by the light from the illuminating portion PQ of the course, but AC portion is somewhat sensed too. Sensing of the AC portion, even if a little, results in that the sharpness of the shadow of the non-penetrating portion is lowered. Since the light from PQ of fluorescent layer 7 spreads in all directions, this is a difficult problem. In order to obtain a sharp image on light-sensitive emulsion layer 10, AC must be less than 100 microns considering the limit of resolving power of the naked eye and the ratio of intensities of light at the point A and $CI_A/I_C$ must be larger than 10 considering the discrimination of lightness. Now, let us suppose that the refractive index of protective layer 8 of fluorescent intensifying screen 2 is substantially the same as that of protective coating 9 of photographic film 1, the sum of thickness thereof PA is usually about 30–50 microns and the maximum allowable value of AC is 100 microns. Then, a relation between the intensity $I_A$ at A on light-sensitive emulsion layer 10 and the intensity $I_C$ at C on the same is represented by the following formula:

Firstly, since the intensities which the points A and C on light-sensitive layer 10 receive from the point of luminescence P are in inverse proportion to their distances respectively, $$\frac{I_C}{I_A} = \left(\frac{PA}{PC}\right)_2 = \cos^2 \theta \qquad (a)$$

On the other hand, since $$\tan \theta = \frac{AC}{PA} = \frac{100}{50} = 2$$

then $$\therefore \theta = 63.4° \qquad (b)$$

making the substitution of the Formula a with b, $$\frac{I_C}{I_A} = \cos^2 63.4 = \frac{1}{5}$$

Since $I_A/I_C$ is necessary for obtaining a sharp image as mentioned above, a light reducing material capable of absorbing 50% or more of the light must be present in the light path of from P to C so as to reduce the intensity at C.

In accordance with the present invention, there are provided a method of recording a radiographic image passing through an object characterized by the presence of a mesh screen as a light reducing material between a fluorescent flat layer and light-sensitive emulsion layer, a fluorescent intensifying screen wherein the mesh screen is provided in a protective layer for the fluorescent layer, and a photographic film wherein the mesh screen is provided in a protective coating for the light-sensitive emulsion layer.

Figure 5:
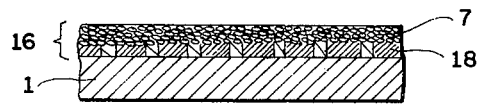
FIG. 5 is a schematic sectional view of another embodiment of the present invention.
Figure 6:
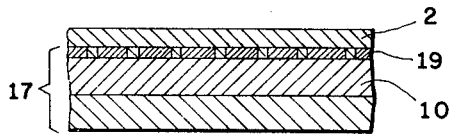
FIG. 6 is a schematic sectional view of a further embodiment of the present invention.

The invention is further illustrated in detail. When light absorbing materials 15 having a sine curved distribution of light absorption as shown in FIG. 3 (the hatched portion 15' of the curve shown below) is allowed to be present between RQ plane and BC plane of FIG. 2, the foregoing disadvantages can be overcome. In practice, for example, a mesh screen such as a contact screen used for photoengraving is inserted as the sine-curved light-absorbing materials 15 between photographic film 1 and ordinary fluorescent intensifying screen 2 comprising fluorescent layer 7 and protective layer 8 as shown in FIG. 3 (right and upper), and the arrangement may be based upon FIG. 4. In addition, the position of such light absorbing layer may be suitably varied. FIG. 5 shows one varied embodiment of our invention, wherein the light absorbing materials is mixed with protective layer 8 of fluorescent intensifying screen 2 of FIG. 3. That is, protective layer 8 and light absorbing materials 15 are combined as a same layer 18 with fluorescent layer 7 into one layer, fluorescent intensifying screen 16 and superposed on photographic film 1. FIG. 6 shows another varied embodiment of this invention, wherein the light absorbing layer is positioned at the position of protective coating 9 of photographic film 1 of FIG. 3. That is, protective coating 9 and light absorbing layer 15 are combined as a same layer 19 with light-sensitive emulsion layer 10 onto one layer, photographic film 17, on which fluorescent intensifying screen 2 is superposed.

Figure 7:
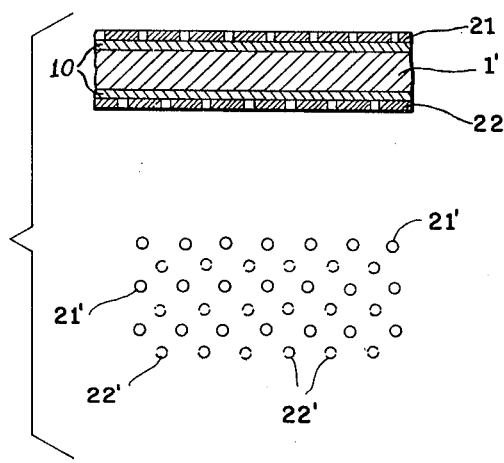
FIG. 7 is a schematic sectional view of still a further embodiment of the present invention.

In applying the mesh screen to a photographic film 1' having light-sensitive emulsion layers 10 at both sides, two mesh screens 21 and 22 are provided at the both sides of the photographic film 1' as shown in FIG. 7 (upper), irrespective as to where they are positioned. In this case, however, the mesh screen should be arranged in such a relation that moires are not caused by the mesh crossings 21', 22', for example, as shown in FIG. 7 (lower, plan view).

Even if the light-sensitive emulsion layer of our invention is adapted to other uses than the usual radiography, sharp images may be obtained, for example, as a photographic material for plate making dots or by subjecting it to infectious development for the same object. This is based upon the same principle as that illustrated in FIG. 2, since a scattered light from a fluorescent materials is absorbed and only the light present in the shortest way to a light-sensitive emulsion layer is subject to sensing.

It is apparent from the foregoing description that the invention has great merit in that the sharpness and cleanness of a radiograph passing through an object and exciting a fluorescent layer are reproduced substantially as they are, and an image having a higher sharpness is recorded on a photographic material than by the conventional radiographic image recording method.

The following examples are given in order to further illustrate the invention:

Example 1

A light absorbing layer of sine curve having a pitch of 3 meshes per mm. was provided as a same layer 19 as a protective coating on the surface of light-sensitive emulsion layer 10 to prepare a photographic film 17, as shown in FIG. 6, on which a fluorescent intensifying screen 2 was closely contacted, and the resulting photographic assembly was used for radiographing one's hand. A very sharp and clear photographic image could be recorded.

Example 2

A light mesh screen of sine surved absorbing having a pitch of 3 meshes per mm. was provided as a same layer as a protective layer on the surface of fluorescent layer 7 to prepare a fluorescent intensifying screen 16 as shown in FIG. 5, which was then closely superposed on a photographic film 1, and the thus resulting photographic assembly was used for radiographing one's hand. A very sharp photographic image could be recorded.

Example 3

On both sides of a photographic film having light-sensitive emulsion layers 10 were provided at the both sides contact screens 20 having meshes of the same pitch to prepare a fluorescent intensifying screen 2 as shown in FIG. 4. In this case, the two contact screens were arranged in such a relation as to prevent formation of moires by the mesh points due to them, as the conventional film for X-ray photography was used as photographic film 1. The thus arranged photographic assembly was used for radiographing one's lung and subjected to super hard developing treatment. Thus, very sharp dot image of vessels and others resulted, facilitating diagnostics.

We claim:
1. An apparatus for recording a radiographic image passing through an object comprising:
    (A) a flat fluorescent layer of fluorescent intensifying screen;
    (B) a light sensitive emulsion layer of a photographic film; and
    (C) a sine curved light-absorbing screen positioned between said flat fluorescent layer and said fluorescent intensifying screen.
2. An apparatus for recording a radiographic image passing through an object as in claim 1, said fluorescent intensifying screen having a light-absorbing mesh screen with a sine curved absorption distribution for protecting a flat fluorescent layer.

No references cited.

RALPH G. NILSON, Primary Examiner

MORTON J. FROME, Assistant Examiner

U.S. Cl. X.R.

96—79, 117; 250—213; 350—276, 316, 317